United States Patent
Ford

(10) Patent No.: US 6,168,510 B1
(45) Date of Patent: Jan. 2, 2001

(54) POULTRY DEFEATHERING DEVICE

(76) Inventor: Ronald B. Ford, 512 Johnson St., Lake Providence, LA (US) 71254

( * ) Notice: Under 35 U.S.C. 154(b), the term of this patent shall be extended for 0 days.

(21) Appl. No.: 09/460,156

(22) Filed: Dec. 13, 1999

Related U.S. Application Data

(63) Continuation-in-part of application No. 08/991,099, filed on Dec. 14, 1999, now Pat. No. 6,001,012.

(51) Int. Cl.$^7$ .................................................. A22C 21/02
(52) U.S. Cl. ............................................. 452/87; 452/90
(58) Field of Search ................................ 452/87, 88, 89, 452/90, 92

(56) References Cited

U.S. PATENT DOCUMENTS

| | | |
|---|---|---|
| D. 135,668 | 5/1943 | Corey et al. . |
| 250,143 | 11/1881 | Graves . |
| 1,217,393 | 2/1917 | Berg . |
| 1,230,222 | 6/1917 | Rieske . |
| 1,674,968 | 6/1928 | Goldstein et al. . |
| 1,695,128 | 3/1928 | Vestine . |
| 1,875,980 | 9/1932 | Bingham . |
| 1,923,415 | 8/1933 | Bingham . |
| 1,980,034 | 11/1934 | Budd et al. . |
| 2,025,784 | 12/1935 | Slayton . |
| 2,194,032 * | 3/1940 | Shepherd ............................... 452/88 |
| 2,206,731 | 7/1940 | Schlicksupp . |
| 2,295,761 | 4/1942 | Smith . |
| 2,300,157 | 10/1942 | Hunt . |
| 2,302,525 | 11/1942 | Campbell . |
| 2,314,700 | 6/1943 | Hanshaw . |
| 2,376,120 | 7/1945 | Campbell et al. . |
| 2,389,404 | 11/1945 | Barker . |
| 2,412,338 | 12/1946 | Jasper . |
| 2,444,556 | 7/1948 | Drews . |
| 2,753,590 | 7/1956 | McKendree . |
| 2,777,158 | 1/1957 | Pitts et al. . |
| 5,106,333 | 4/1992 | Van Dorn et al. ...................... 452/91 |
| 5,135,430 | 8/1992 | Jordan et al. .......................... 452/86 |
| 5,944,595 * | 8/1999 | Prothro .................................. 452/88 |

FOREIGN PATENT DOCUMENTS

| | | | |
|---|---|---|---|
| 3139337 * | 4/1983 | (DE) ...................................... 452/87 |
| 741977 | 12/1955 | (GB) ...................................... 452/87 |

OTHER PUBLICATIONS

Stromberg s 1997 Catalog; Pine River, Minnesota; p. 20.
Orvis Fall 1997 Catalog; Roanoke, Virginia; p. 37.
Herter s 1997 Catalog; Burnsville, Minnesota; p. 57.

* cited by examiner

Primary Examiner—Willis Little

(57) ABSTRACT

The invention entails a defeathering cylinder having a plurality of fingers extending radially from its curved surface. The cylinder is mounted on a shaft positioned along the axis of the cylinder. The cylinder is rotatably mounted to an enclosure having a top, a bottom, a front wall, a back wall opposite the front wall, and sides connecting the front wall to the back wall. The front wall of the enclosure contains a cylinder opening. The back wall contains a plurality of apertures sized to substantially inhibit the passage of feathers. A power source such as an electric motor is functionally connected to the shaft on which the cylinder is mounted. Operation of the motor causes the shaft and the cylinder to revolve within the cylinder opening. The revolution of the fingers extending from the cylinder causes air to flow into the cylinder opening and out the apertures. When a bird is placed in contact with the revolving fingers, the feathers will be removed and drawn into the enclosure and toward the back wall. Once inside the enclosure, the direction of air flow will prevent the feathers from exiting the enclosure though the cylinder opening. The size of the apertures in the back wall prevents the feathers from exiting the enclosure through the back wall. Eventually, gravity will pull the feathers downward to the enclosure bottom where an opening is provided to allow the feathers to exit the enclosure.

10 Claims, 2 Drawing Sheets

POULTRY DEFEATHERING DEVICE

CONTINUATION-IN-PART APPLICATION

This application is a continuation-in-part of U.S. patent application Ser. No. 08/991,099, which will issue as U.S. Pat. No. 6,001,012 on Dec. 14, 1999, and which is hereby incorporated by referenced in its entirety.

BACKGROUND OF THE INVENTION

1. Field of the Invention

The invention relates to poultry defeathering devices in general, and to devices intended to be used with unscalded birds in particular.

2. Prior Art

It is well known in the prior art to remove feathers from poultry using a machine essentially comprising a plurality of rubber fingers mounted on a rotatable wheel or cylinder. A bird's feathers may be plucked by bringing the bird into contact with the rotating fingers.

In commercial poultry processing operations, the bird is frequently scalded prior to plucking. The bird is typically dipped in very hot water (in excess of 150° F.). This loosens the feathers in the skin and makes them easy to remove. It also adds weight to the feathers, making them easy to capture. A simple wall can be placed behind the rotating wheel so that the plucked feathers are thrown against the wall upon the rotation of the cylinder. The feathers will then slide down the wall into a receptacle.

However, scalding has substantial drawbacks that are particularly pertinent outside of large scale poultry processing operations. For example if the birds are overheated, the skin may be damaged so that it may be easily torn during plucking. If the birds cool after scalding, the skin will contract around the feathers, locking them into the skin. This makes the feathers more difficult to remove than they would have been had the bird not been scalded at all. To ensure that birds are scalded at the correct temperature, it is necessary to have a water heater of some sort that is capable of maintaining the water temperature at a uniform level. Such equipment may constitute a substantial expense. Additionally, the presence and use of scalding hot water creates obvious burn risks to human operators.

It is not necessary to scald the bird in order to remove its feathers using a rotating cylinder type plucker. However, if the feathers are not wet, they are quite light. Plucking them with a rotating cylinder will scatter the feathers. This makes the feathers difficult to collect if they are to be used for pillow stuffing or other purposes. It can also make a substantial mess such as that which might result from the ill advised combination of a hair dryer, a burst feather pillow, and a mischievous child.

Therefore, a poultry defeathering device meeting the following objectives is desired.

OBJECTS OF THE INVENTION

It is an object of the invention to provide a device capable of removing feathers from poultry.

It is another object of the invention to provide a device that can remove feathers from unscalded poultry.

It is another object of the invention to provide a device that can prevent the scattering of feathers removed from unscalded poultry.

It is yet another object of the invention to provide a device that can collect feathers removed from unscalded poultry.

SUMMARY OF THE INVENTION

The invention comprises a defeathering cylinder having a plurality of fingers extending radially from its curved surface. The cylinder is mounted on a shaft positioned along the axis of the cylinder parallel to the curved surfaces of the cylinder. The cylinder is rotatably mounted on an enclosure having a top, a bottom, a front wall, a back wall opposite the front wall, and sides connecting the front wall to the back wall. The front wall of the enclosure contains a cylinder opening. The back wall contains a plurality of apertures, perforations or slots sized to substantially inhibit the passage of feathers through the apertures. A power source such as an electric motor is mounted to the enclosure. The motor is functionally connected to the shaft on which the cylinder is mounted, preferably through a pair of pulleys and a belt. Operation of the motor causes the shaft and the cylinder to revolve. The cylinder is positioned to revolve in line with the cylinder opening in the front wall of the enclosure.

The revolution of the fingers extending from the cylinder causes air to flow into the cylinder opening in the front wall of the enclosure and out the apertures in the back wall. When a bird is placed in contact with the revolving fingers, the feathers will be removed and drawn into the enclosure and toward the back wall. Once inside the enclosure, the direction of air flow will prevent the feathers from exiting the enclosure though the cylinder opening. The size of the apertures in the back wall prevents the feathers from exiting the enclosure through the back wall. Eventually, gravity will pull the feathers downward to the enclosure bottom. An opening is provided in the bottom of the enclosure which allows the feathers to fall out of the enclosure. A receptacle may be placed under the opening in the bottom to catch the feathers. Nothing in the disclosed design prevents its use with scalded poultry; however, one of its principal advantages is that it may be used with unscalded poultry having light dry feathers without scattering the feathers.

DETAILED DESCRIPTION OF THE PREFERRED EMBODIMENT

Figure 1:
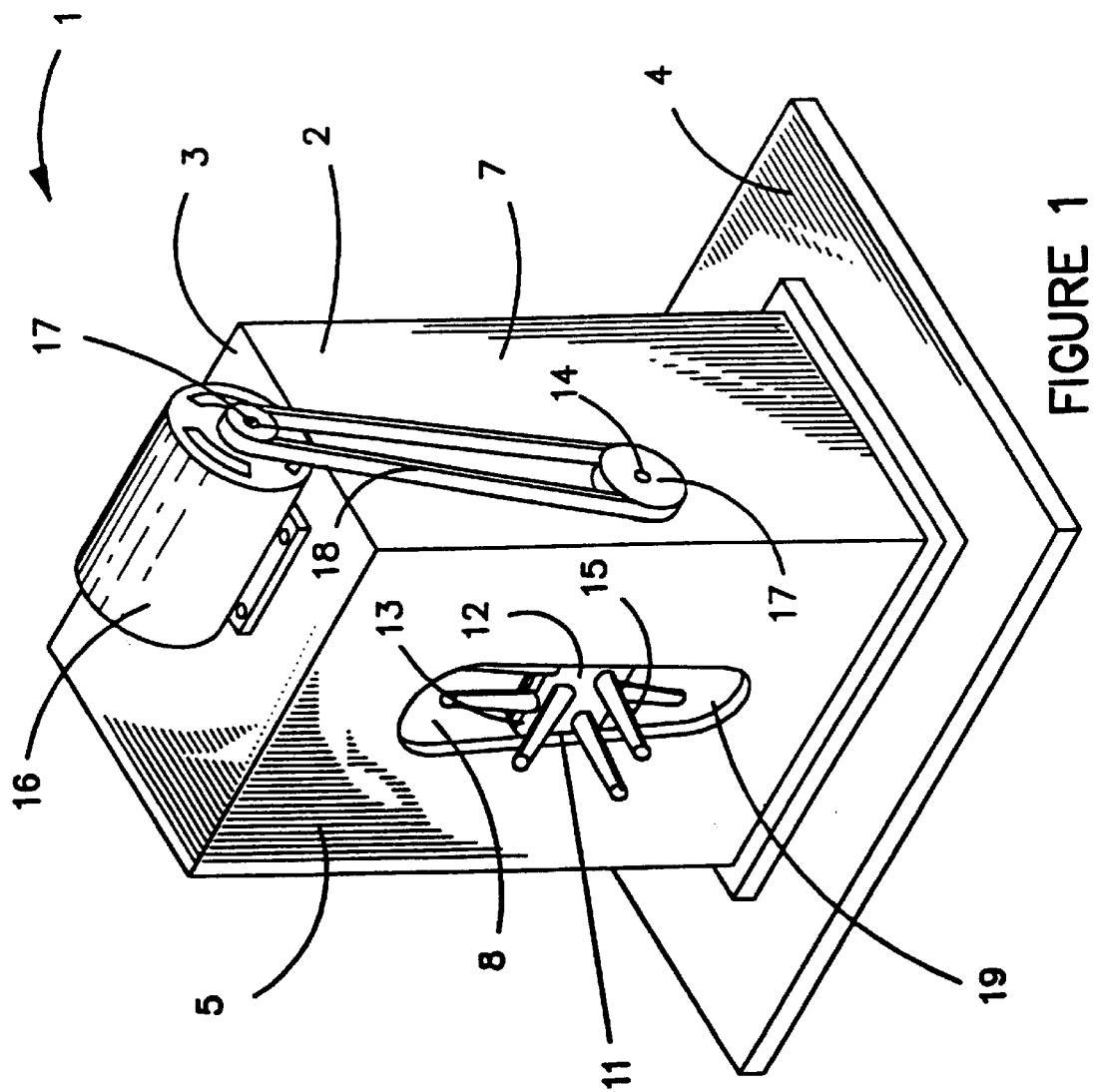
FIG. 1 is a front perspective view of a preferred embodiment of the invention.

The invention comprises a defeathering device 1 for removing poultry feathers from unscalded birds. Defeathering device 1 comprises an enclosure 2 having a top 3 and a bottom 4, a front wall 5 and a back wall 6 opposite front wall 5, and sides 7 connecting front wall 5 to back wall 6. In the preferred embodiment illustrated, enclosure 2 is shown to be box shaped. However, enclosure 2 may be other shapes as well, including but not limited to, generally cylindrical, generally pyramidal, generally conical, and generally domed. Enclosure 2 and its defining walls and surfaces should be interpreted broadly to include such shapes. Enclosure 2 may be built of wood, or metal, or plastic, or any other conventional cabinetry material.

Front wall 5 contains a cylinder opening 8, and back wall 6 contains a plurality of apertures 9, although apertures 9 and cylinder opening 8 may be positioned elsewhere in enclosure 2. Together, cylinder opening 8 and apertures 9 provide an air path through enclosure 2. Apertures 9 should allow the passage of air through back wall 6 but they should be sized to prevent or at least substantially inhibit the passage of feathers. It should be noted that apertures 9 do not have to be sized to make the passage of feathers impossible. For example, openings which are large enough to allow a feather to pass when the vane of the feather is positioned parallel to the opening may be sufficiently small to prevent the discharge of the feather when its vane is transverse to the opening. Because a feather's orientation within enclosure 2 will be essentially random, a feather will only rarely encounter apertures 9 such that its vane is parallel to aperture 9. Apertures 9 will, therefore, be sized to substantially inhibit the passage of feathers when they will prevent most feathers from passing through with their vanes transverse to the aperture. Apertures 9 are preferably provided as a plurality of substantially circular perforations 10 in back wall 6 having a diameter of less than about ¼ of an inch. Other embodiments of apertures 9 include, but are not limited to, a plurality of slots in back wall 6 and a screened opening in back wall 6. A sufficient number of apertures 9 should preferably be provided for the substantially unobstructed passage of air through enclosure 2. In a preferred embodiment, approximately 128 substantially circular perforations having a diameter of about 3/16 of an inch are provided in back wall 6.

Defeathering device 1 further comprises a defeathering cylinder 11. In a preferred embodiment defeathering cylinder 11 has curved surfaces 12 and flat ends 13. Defeathering cylinder 11 also has a centrally located axis of rotation which is parallel to curved surfaces 12 and perpendicular to flat ends 13. Defeathering cylinder 11 is mounted on a shaft 14 such that revolution of shaft 14 will cause defeathering cylinder 11 to rotate symmetrically about its axis. Extending substantially radially from curved surfaces 12 of cylinder 11 are a plurality of defeathering fingers 15. Defeathering fingers 15 are preferably made according to the teachings of U.S. Pat. No. 2,300,157 which is hereby incorporated by reference in its entirety to the extent it is not contrary to the teachings herein. Fingers 15 believed to be made according to the U.S. Pat. No. 2,300,157 are available from Pickwick Manufacturing Services, Inc. of 1870 McLoud Place, NE, Cedar Rapids, Iowa. In a preferred embodiment, cylinder 11 is between about 3⅞ and 4⅞ inches wide between flat ends 13. In the same preferred embodiment, cylinder 11 and defeathering fingers 15 span about 9 ¾ inches across the length of fingers 15.

Shaft 14 is preferably mounted in sides 7 in a matched pair of aligned ball or sintered bronze bushing type flanged bearings such that the axis of rotation of cylinder 11 is positioned inside enclosure 2. Cylinder 11 should be positioned in cylinder opening 8 so that fingers 15 may revolve without contacting front wall 5. Cylinder 11 should be positioned so that at least a portion of at least some of fingers 15 are always inside enclosure 2 and so that at least a portion of at least some of fingers 15 are outside enclosure 2. Cylinder opening 8 is preferably sized to conform closely to cylinder 11 and fingers 15. In a preferred embodiment, cylinder opening 8 is less than ¾ of an inch wider than the width of cylinder 11 between flat ends 13 and less than 5¾ inches longer than the span across cylinder 11 and fingers 15.

Figure 3:
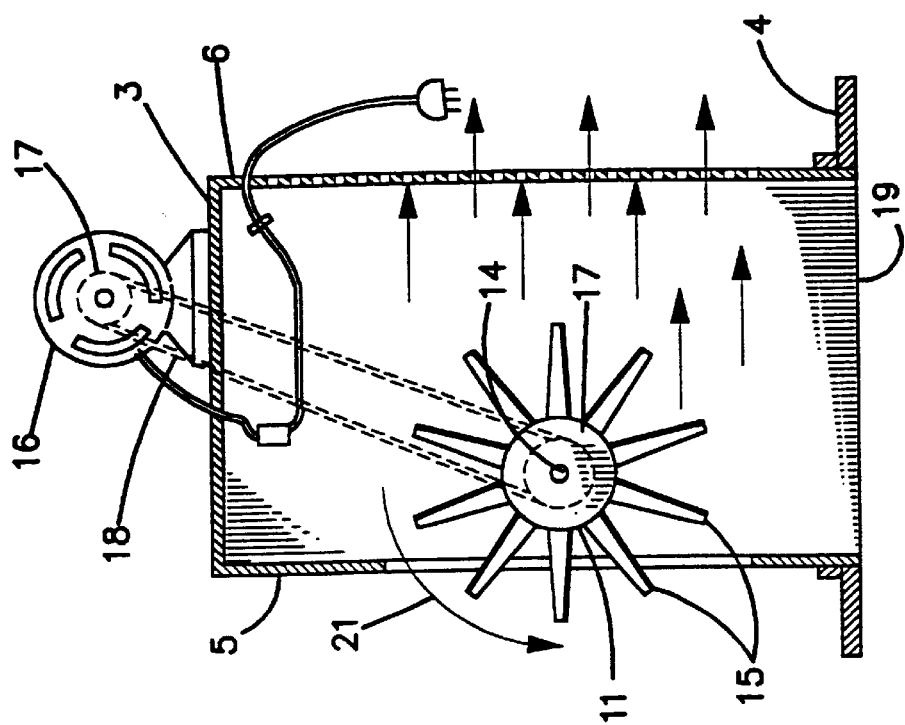
FIG. 3 is a rear view of a preferred embodiment of the invention.
Figure 2:
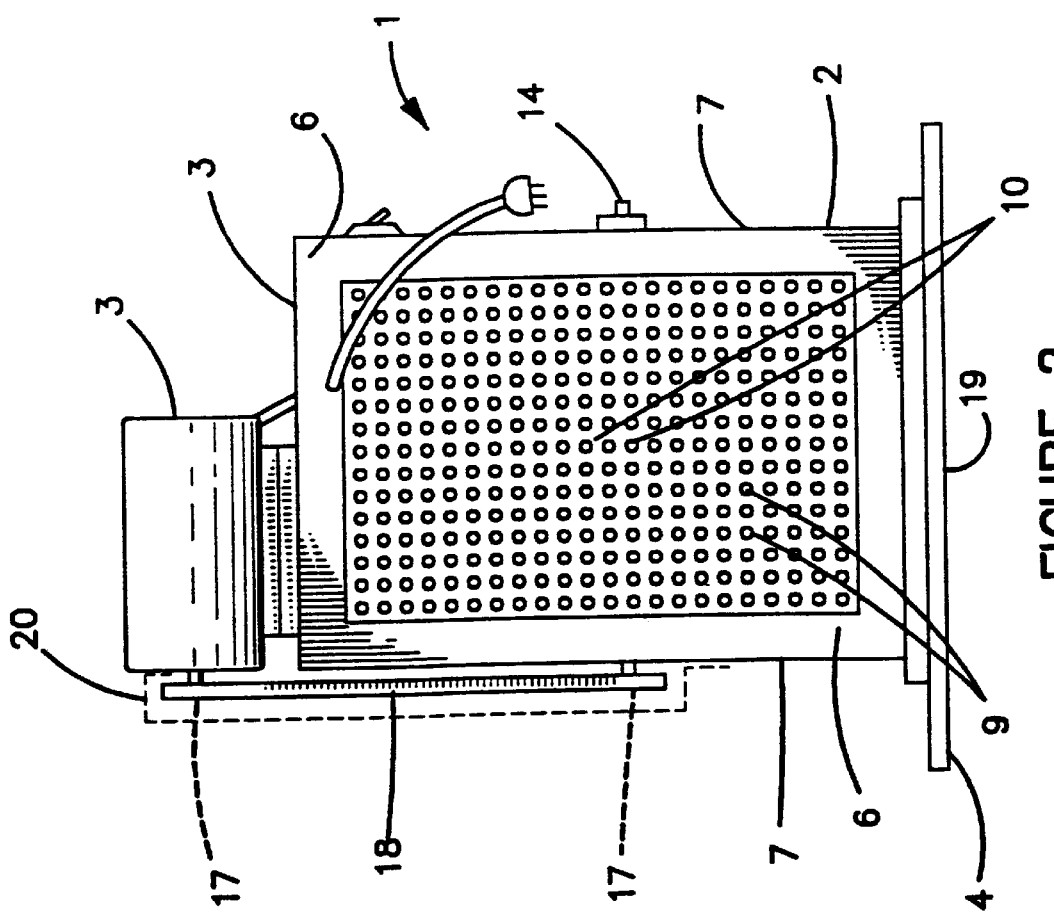
FIG. 2 is a cut away side view of a preferred embodiment of the invention.

The majority of the clearance between cylinder opening 8 and cylinder 11 and fingers 15 in the dimension perpendicular to the axis of rotation of cylinder 11 should preferably be provided on the side of cylinder 11 closest to bottom 4. The clearance on the side of cylinder 11 that faces top 3 should preferably be as narrow as possible. Cylinder 11 should preferably be configured to revolve so that fingers 15 move in an up to down path when viewed from the exterior of enclosure 2 as indicated by rotational arrow 21 shown in FIG. 3. By minimizing the clearance on the "top" side of cylinder 11, the likelihood that a feather may be pushed back through cylinder opening 8 by fingers 15 will be minimized. The clearance on the "top" side of cylinder 11 should preferably be about 1¾ of an inch or less. A feather guard may be provided over the top 15 to 25 percent of cylinder 11 to prevent any feathers that may be discharged from enclosure 2 from being discharged into the face of the operator. Such concerns will not be as critical on the "bottom" side of cylinder 11 as fingers 15 will be pushing air into enclosure 2. Also, some clearance on the "bottom" side of cylinder 11 is desirable to allow for convenient access to fingers 15 by the poultry being plucked.

A power source 16 such as a ½ or ⅓ horsepower electric engine, preferably having a standard revolution rate of 1725 rotations per minute (rpm's), causes shaft 14 and thus cylinder 11 and fingers 15 to revolve. The connection between power source 16 and shaft 14 is preferably provided by pulleys 17 and a belt 18. Pulleys 17 and power source 16 should preferably be configured to effect a revolution rate of cylinder 11 of about 650 to about 700 rpm. Pulleys 17 and belt 18 should preferably be covered by a belt guard 20.

When cylinder 11 is driven by power source 16, cylinder 11 will rotate about its axis of rotation. The rotation of cylinder 11 and fingers 15 extending therefrom will cause air to be driven through enclosure 2. Air will enter enclosure 2 via cylinder opening 8 and exit enclosure 2 through apertures 9 creating an air flow path through enclosure 2 extending from cylinder opening 8 to apertures 9 such as that illustrated in FIG. 3.

The preferred embodiment of poultry defeathering device 1 described herein is believed to be especially suited for small scale defeathering operations such as the plucking of waterfowl taken by duck and goose hunters or the residential plucking of chickens. However, the use of defeathering device 1 in commercial environments and/or with other types of poultry is not outside the intended scope of the invention.

In operation, poultry will be brought into contact with revolving fingers 15, preferably against the grain of their feathers, and preferably in the lower exposed quadrant of cylinder 11. Revolving fingers 15 will remove the feathers from the bird. Fingers 15 and the air flow path will pull the feathers through cylinder opening 8 into enclosure 2. Once inside enclosure 2, the feathers will likely be carried above or below the main air flow path extending between cylinder opening 8 and apertures 9 by eddies in the air flow. Those feathers that rise above the air flow path will eventually be recaptured by the air flow path as they are pulled down by gravity. Those feathers that fall below the air flow path will settle to bottom 4 of enclosure 2. A feather discharge opening 19 is preferably provided in bottom 4 to allow feathers to fall out of enclosure 2. Feather discharge opening 19 may comprise all or substantially all of bottom 4. A feather receptacle (not shown) may be positioned under feather discharge opening 19 so that the feathers falling out of enclosure 2 can be collected. The feather receptacle may be any conventional receptacle including but not limited to an open barrel, a box, a bag, or a garbage can. In a less preferred embodiment of poultry defeathering device 1, feather discharge opening 19 may be omitted. In this embodiment, plucked feathers are retained in enclosure 2 during operation. After defeathering, the feathers may be discharged through cylinder opening 8.

Although the vast majority of the feathers that are removed from the bird will enter enclosure 2 and exit through feather discharge opening 19, a minimal number of feathers may either never enter enclosure 2 or exit enclosure 2 through cylinder opening 8. The likelihood of either situation occurring may be minimized by ensuring that apertures 9 are unobstructed and that there is sufficient clearance between enclosure 2 and external structures or walls to prevent such external structures from impeding the passage of air through enclosure 2. Also, cylinder opening 8 may be provided with an internal flange to deter reentry by feathers inside enclosure 2.

There are, of course, alternate embodiments which should be obvious to those of ordinary skill in the art in view of the foregoing description of the invention which are intended to be included within the scope of the invention as described by the following claims.

I claim:

1. A poultry defeathering device comprising:

an enclosure having a top, a bottom, a front wall, a back wall opposite said front wall, and sides connecting said front wall to said back wall and said top to said bottom, said enclosure containing a cylinder opening, said enclosure further containing a plurality of apertures providing air passages through said enclosure, said apertures sized to substantially inhibit the passage of feathers through said apertures;

a defeathering cylinder having a plurality of defeathering fingers extending substantially radially therefrom, said cylinder having an axis of rotation substantially perpendicular to said fingers, said cylinder rotatably positioned relative to said cylinder opening such that during at least a portion of each revolution of said cylinder, said fingers extend at least partially from said enclosure, and such that during at least a portion of each revolution of said cylinder, said fingers extend at least partially into said enclosure; and a power source operatively connected to said cylinder whereby said cylinder may be rotated about its axis of rotation to drive air through said cylinder opening and said apertures.

2. A poultry defeathering device according to claim 1 wherein said bottom contains a feather discharge opening.

3. A poultry defeathering device according to claim 1 wherein said apertures have at least one transverse dimension less than about ¼ of an inch in width.

4. A poultry defeathering device according to claim 1 wherein said axis of rotation of said cylinder is positioned inside said enclosure.

5. A poultry defeathering device according to claim 4 wherein said apertures have at least one transverse dimension less than about ¼ of an inch in width.

6. A poultry defeathering device according to claim 4 wherein the clearance between said fingers and cylinder opening on the side of said cylinder opening closest to said top is less than about ¼ of an inch.

7. A poultry defeathering device according to claim 6 wherein said apertures have at least one transverse dimension less than about ¼ of an inch in width.

8. A poultry defeathering device according to claim 1 wherein said cylinder opening is contained in said front wall.

9. A poultry defeathering device according to claim 8 wherein said apertures are contained in said back wall.

10. A poultry defeathering device according to claim 1 wherein said apertures are contained in said back wall.

* * * * *